Figure 6:
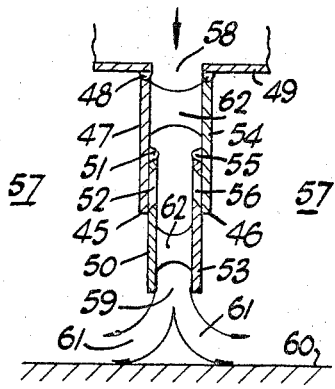

Aug. 30, 1966     K. HALL     3,269,477
VEHICLES FOR TRAVELLING OVER A SURFACE
Filed March 6, 1964     2 Sheets-Sheet 1
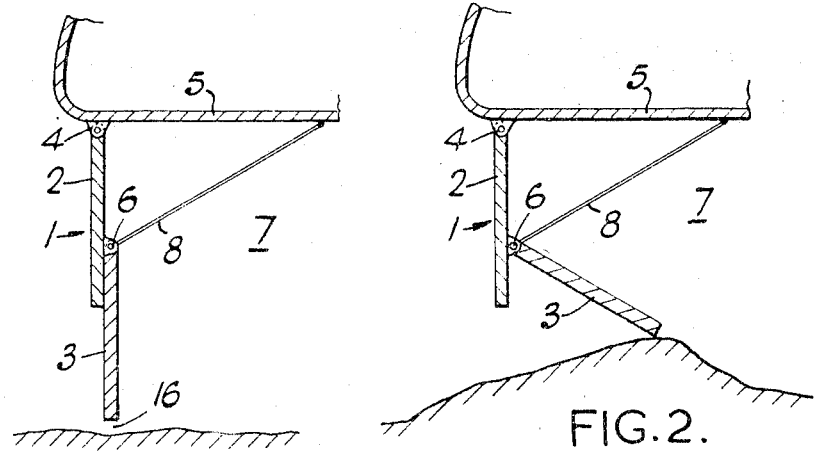
FIG.1.     FIG.2.
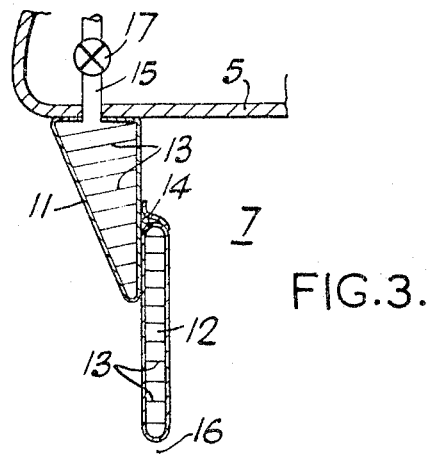
FIG.3.
FIG.4.
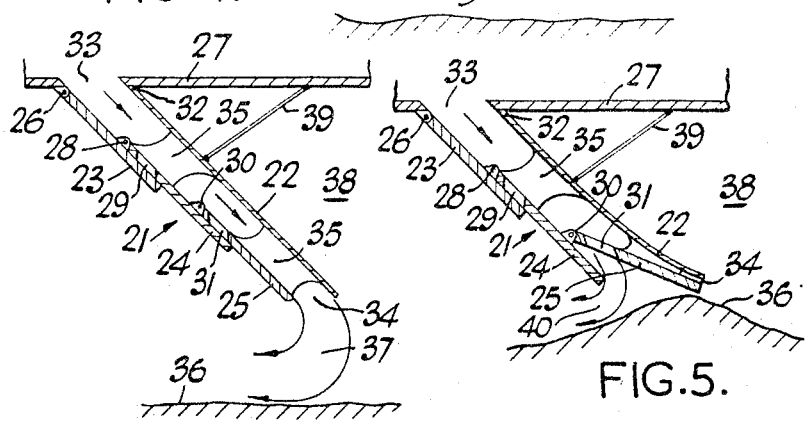
FIG.5.
INVENTOR
K. HALL
BY Cameron, Kerkam & Sutton
ATTORNEYS Aug. 30, 1966         K. HALL         3,269,477
VEHICLES FOR TRAVELLING OVER A SURFACE
Filed March 6, 1964                    2 Sheets-Sheet 2

INVENTOR
K. HALL
BY
Cameron, Kerkam & Sutton
ATTORNEYS

United States Patent Office 3,269,477
Patented August 30, 1966

3,269,477
VEHICLES FOR TRAVELLING OVER A SURFACE
Kenneth Hall, Hythe, Southampton, England, assignor to Hovercraft Development Limited, London, England, a British company
Filed Mar. 6, 1964, Ser. No. 349,833
Claims priority, application Great Britain, Mar. 6, 1963, 8,961/63
11 Claims. (Cl. 180—7)

This invention relates to vehicles for travelling over a surface and which are supported above that surface, at least in part, by a cushion of pressurised gas formed and contained beneath the vehicle.

The cushion can be contained at its periphery by a downwardly depending wall structure which may be flexible and/or flexibly attached to the lower part of the vehicle, by curtains of moving fluid issuing from the lower part of the vehicle, or by a combination of fluid curtains and downwardly depending wall structure.

To reduce weight and also to avoid transmission of large loads to the vehicle, it is desirable that any flexible or flexibly attached wall structure should be as light as possible and readily deflected. At the same time such structures have to be strong enough to sustain the pressure of the gas cushion they contain. Further, when deflected by passage past an obstacle, it is necessary that the structure returns to its normal position as soon as possible after passing the obstacle, to avoid leaving an increased gap through which the cushion gas can escape.

According to the invention there is provided a vehicle for travelling over a surface, and which is supported above the surface, at least in part, by a cushion of pressurized gas formed and contained in a space beneath the vehicle, said space being bounded for at least part of its periphery by a deflectable wall structure having at least one wall, the wall comprising an upper member depending below the bottom of the vehicle and a lower member depending below the upper member and pivotally attached thereto, the upper part of the lower member overlapping the lower part of the upper member on that side of the upper member exposed to the higher pressure, said pressure acting on the lower member and tending to maintain the lower member in a downward undeflected position. Further members can depend successively below the lower member to provide further stages of deflection.

Such deflectable wall structures can be used with or without a provision of means for forming a fluid curtain from the bottom of the wall structure. Where a curtain of moving fluid issues from the bottom of a deflectable wall-structure, the fluid curtain then contains the cushion for the lower part of its periphery, the wall structure sealing the upper part of its periphery. When the vehicle meets small obstacles the clearance afforded by the fluid curtain is sufficient to clear the obstacle without deflection of the wall structure. When meeting larger obstacles, the wall structure can deflect.

In addition to sealing the periphery of the cushion the fluid forming the curtain may also make good losses of fluid from the cushion. However, deflection of the wall structure can result in restriction of the flow of curtain-forming fluid and this may produce the effect that there is insufficient flow of fluid to make up for the losses from the cushion.

It is a feature of the present invention that where a fluid curtain is formed from the bottom of a deflectable wall structure, deflection of the structure serves to open one or more ports to release a flow of fluid therethrough which can at least assist in making up any losses from the cushion.

According to a feature of the invention the deflectable wall structure comprises at least one wall, the wall comprising an upper member depending below the bottom of the vehicle and a lower member depending below the upper member and pivotally attached thereto, the upper part of the lower member overlapping the lower part of the upper member on that side of the upper member exposed to the higher pressure, said pressure acting on the lower member and tending to maintain the lower member in a downward undeflected position, at least one of the overlapping parts having a port therethrough, the other overlapping part tending to close said port, the lower member on deflection serving to release a flow of fluid through said port.

The wall structure may comprise two walls spaced apart to form a nozzle through which the curtain-forming fluid flows. Alternatively, the structure may be a single wall, the curtain-forming fluid flowing down one surface thereof.

Figure 7:
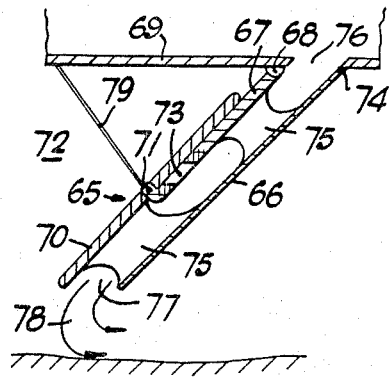
Figure 8:
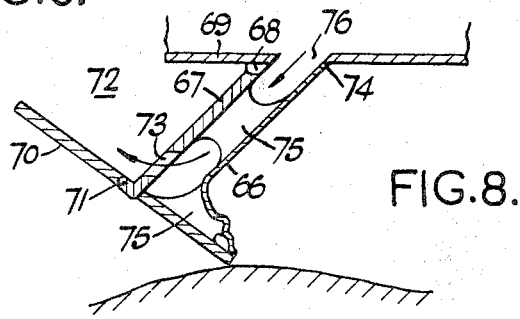
Figure 9:
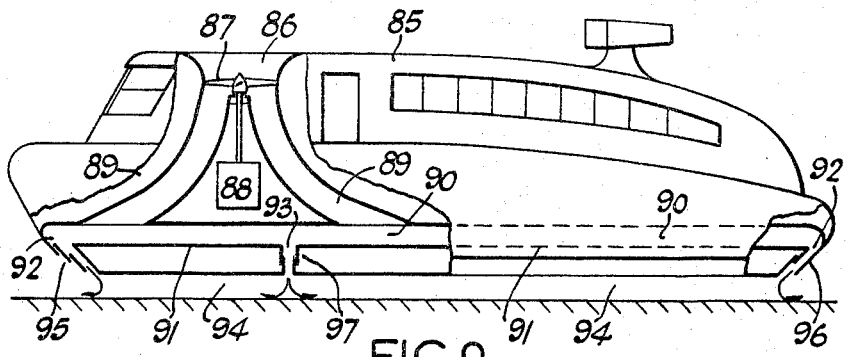

The invention will be understood by the following description of certain embodiments in conjunction with the accompanying diagrammatic drawings in which:

FIGURE 1 is a vertical cross-section through one form of wall structure in one operating position, FIGURE 2 illustrates the structure of FIGURE 1 in an alternative position, FIGURE 3 is a vertical cross-section through a further form of wall structure, FIGURE 4 is a vertical cross-section through another form of wall structure, in one operating position, FIGURE 5 illustrates the structure of FIGURE 4 in an alternative position, FIGURE 6 is a vertical cross-section through a wall structure in the form of a nozzle, FIGURE 7 is a vertical cross-section through yet a further form of wall structure, in one operating position, FIGURE 8 illustrates the structure of FIGURE 7 in an alternative position, and FIGURE 9 is a vertical cross-section through a vehicle embodying the invention, parallel to the fore and aft axis thereof, FIGURE 1 illustrates a wall structure 1, comprising an upper member 2 and a lower member 3. The upper member 2 is flexibly attached at its upper end 4 to the bottom surface 5 of the vehicle. The lower member 3 is pivotally attached at its upper end 6 to the upper member 2, the upper part of the lower member overlapping the lower part of the upper member. The lower member is attached to that side of the upper member on which acts the pressure of the cushion of pressurised gas formed in the space 7. A tie 8 is provided between the upper member 2 and the bottom surface 5.

The wall structure is held in the downward position by the pressure of the cushion but can readily deflect inwards towards the cushion space 7. Thus, as illustrated in FIGURE 2, on meeting a small obstacle, the lower member 3 will deflect inwards, the upper member not deflecting. The lower member will rapidly return to its downward position under the action of the pressure of the cushion, once the obstacle has passed. If higher obstacles are met, the upper member can deflect also.

If the tie 8 is inextensible, then the wall structure 1 is capable only of deflection inwards towards the space 7, but if it is extensible, then the wall structure can also deflect outwards away from the space 7. In the latter case the tie must be capable of sustaining the load produced by the cushion pressure on the wall structure, extending only when this load is exceeded.

The upper and lower members can be of any suitable construction; in FIGURES 1 and 2, the members 2 and 3 are of rigid or substantially rigid construction. FIGURE 3 illustrates an alternative arrangement in which both the upper member 11 and the lower member 12 are of inflated construction. Further the upper member 11 is of a cross-section which provides sufficient stiffness to sustain the cushion pressure acting on the wall structure, enabling a tie to be dispensed with. Both members are stabilised to the desired shapes by means of internal ties 13. The lower member 12 is attached to the upper member 11 by a hinge 14 of flexible material.

The lower member is permanently inflated, while the upper member is inflated by air supplied through a duct 15. The inflation pressure of the upper member 11 can thus be varied, for example, by a valve 17. Alternatively, the upper member can also be permanently inflated.

The wall structures so far described are applicable to vehicles of the so-called "plenum-chamber" type, in which the cushion of pressurised gas is contained at its periphery by a wall structure, gas escaping from the cushion through a small clearance 16, as in FIGURES 1 and 3. The invention is also applicable, as stated above, to vehicles of the type in which the gas cushion is contained for its upper part of its periphery by a deflectable wall structure and for the lower part by a curtain of moving fluid.

In FIGURE 4 the wall structure for containing the cushion for the upper part of its periphery comprises an outer wall 21 and an inner wall 22. The outer wall 21 consists of a series of members 23, 24 and 25. The upper member 23 is flexibly attached at its upper end 26 to the bottom surface 27 of the vehicle. Member 24 is attached at its upper edge to the lower part of member 23 by means of a pivot 28. The lower part of the upper member 23 and the upper part of the lower member 24 thus overlap. In the upper or overlapping portion of the member 24 there is formed a port 29. This port is normally closed by the overlapping lower portion of member 23. The further member 25 is similarly attached to the lower part of member 24 by means of a pivot 30. A port 31 is also formed in the upper or overlapping portion of the member 25, the port normally being closed by the overlapping part of member 24.

The inner wall 22 is in the form of a thin flexible sheet, flexibly attached at its upper end 32 to the bottom surface 27 of the vehicle. The inner wall is spaced from and generally parallel to the outer wall 21, to form a nozzle, and a port 33 is formed in the bottom surface 27 of the vehicle between the attachment positions of the two walls. Fluid is supplied through the port 33 and flows down through the nozzle to issue from a port 34 formed by the lower ends of the inner and outer walls. The inner wall is connected to the outer wall by webs 35, and a tie 39, which can be an extension of the upper web 35, extends between the inner wall 22 and the bottom surface 27. The fluid issuing from the port 34 flows towards the surface 36 to form a curtain of moving fluid 37 in the normal manner, a cushion of pressurised gas being formed and contained in the space 38.

FIGURE 5 illustrates the operation of the example of FIGURE 4 over an obstacle. When the structure, or nozzle, passes over an obstacle which has a height greater than the clearance between the bottom of the structure and the normal surface level, then the structure is deflected, upwards and inwards towards the cushion as, for example, in FIGURE 5. Deflection can cause the two walls to come into contact with one another, closing off the flow through the nozzle to the port 34. As will be seen in FIGURE 5, however, deflection of the lowest member 25 opens port 31 and fluid can issue through this port to form a fluid curtain 40. Further deflection of the structure, or nozzle, will result in deflection also of the next higher member 24, fluid then issuing through the port 29. Finally, for high obstructions, the upper member 23 can also deflect.

The fluid flowing through the port 31, and/or the port 29, and forming a curtain, or curtains, of fluid, assists in maintaining the enclosure of the cushion. Further, if due to momentum or a sudden knock the members are deflected upwards away from the surface, the curtains will prevent or reduce loss of the cushion gas. Also, where the fluid forming the curtain is the same as the gas forming the cushion, which is generally the case, the fluid curtains can assist in making up for any losses from the cushion.

FIGURE 6 illustrates an arrangement which operates in both directions. This is particularly convenient when the structure is dividing a cushion or cushions. The structure comprises two walls 45 and 46 spaced apart and generally parallel and forming a nozzle. Wall 45 comprises an upper member 47 flexibly attached at its upper end 48 to the bottom surface 49 of the vehicle, and a lower member 50 attached at its upper edge to the lower part of the upper member 47 by a pivot 51. A port 52 is formed in the overlapping upper part of the lower member 50, the port being normally closed by the overlapping lower part of the upper member 47. The other wall 46 is constructed in a similar manner to wall 45. The lower member 53 is attached to the upper member 54 by a pivot 55, and a port 56 is formed in the upper part of the lower member 53. The lower members 50 and 53 are attached to the inner surfaces of their respective upper members, i.e., the surfaces of the upper members remote from the cushion spaces 57, as the pressure in the nozzle is normally higher than the pressure in the spaces 57.

A port 58 is formed in the bottom surface 49 of the vehicle between the attachment positions of the walls 45 and 46. A fluid is supplied through the port 58 and flows down through the nozzle formed by the walls 45 and 46 to issue from a port 59 formed by the lower ends of the walls. This fluid flows toward the surface 60 to form a curtain of moving fluid 61. Deflection of the structure, or nozzle, to the right in FIGURE 5 will cause the members 50 and 52 to deflect to the right, opening port 53 through which fluid can flow. Deflection of the structure, or nozzle, in the other direction results in port 56 being opened. Webs 62 can be provided between the members.

The port which is uncovered, or opened, on deflection of the structure can be formed, alternatively, in the lower part of the upper member, and such an arrangement is illustrated in FIGURES 7 and 8. The structure comprises an inner wall 65 and outer wall 66. The inner wall 65 consists of an upper member 67 flexibly attached at its upper edge 68 to the bottom surface 69 of the vehicle, and a lower member 70 pivotally attached to the bottom edge of the upper member 67 by a pivot 71 and on the side thereof adjacent to the cushion space 72. To ensure that the lower member normally tends to maintain its upper part in contact with the upper member 67 the pivot position should be slightly below the mid point of the lower member, the balance of pressure on the lower member thus being such as will produce this result. Alternatively, some biasing means such as a spring is required. A port 73 is formed in the lower part of the upper member 67, this port normally being closed by the overlapping upper part of the lower member 70 as in FIGURE 7.

The outer wall 66 is in the form of a flexible sheet, flexibly attached at its upper edge 74 to the bottom surface 69 of the vehicle. Webs 75 may be provided to maintain the spaced apart relationship of the walls 65 and 66. A port 76 is formed in the bottom surface 69 of the vehicle, between the top edges of the two walls. Fluid is supplied through the port 76 and flows between the walls to a port 77 formed by the lower ends of the walls. The fluid issues from the port 77 to form a curtain of moving fluid 78. A tie 79 is provided between the pivot 71 and the bottom surface 69.

When the structure is deflected by an obstacle, the lower part of the lower member deflecting to the right as in FIGURE 8, the port 77 is closed. Deflection of the lower member however uncovers the port 73 and fluid, which in the present case would be a gas normally the same as the gas forming the cushion, would flow into the cushion space to affect any losses which occur.

In the examples illustrated in FIGURE 6 and in FIGURES 7 and 8, a wall is shown which is formed by only two members. More members can of course be provided, for example three as in FIGURES 4 and 5, or even more.

It will be appreciated that the embodiments illustrated in FIGURES 1 to 5 deflect more readily towards the cushion space and are thus more suitable for use at the front of a vehicle and possibly also along the sides and for any dividing wall structures extending in a fore and aft direction. In the embodiment illustrated in FIGURES 7 and 8, the lower member deflects in such a manner that the bottom part moves outwards away from the cushion space, and therefore is more suitable for use at the rear of a vehicle, a dividing wall structure extending across the vehicle, and possibly also for wall structures extending along the sides of the vehicle or parallel thereto.

The construction of the members illustrated in FIGURES 4 to 8 can vary. Thus as illustrated in FIGURE 1 each member can be of rigid or semi-rigid construction. An alternative construction, as in FIGURE 2, is one in which each member is of flexible material in the form of gas-tight sections or the like and inflated. Constraining means may be provided inside the inflated sections to maintain the desired cross-section. Where walls comprising two or more members co-operate with other walls, such as walls 22 and 66 in FIGURES 4 and 7 respectively, these other walls can also be of various constructions, such as single sheets of flexible material, sections of rigid material flexibly connected or of inflated construction.

FIGURE 9 illustrates a vehicle 85, having an intake 86 through which air is drawn by a propeller 87 driven by an engine 88. The air is energised by the propeller 87 and flows through duct 89 to a chamber 90 extending over the bottom surface 91 of the vehicle. The air issues from the chamber 90 via a port 92 formed in the bottom surface of the vehicle and extending round the periphery thereof. A further port 93 is formed in the bottom surface and extending across the vehicle. The air issuing from the port 92 forms a curtain of moving air which forms and contains a cushion of pressurised air in the space 94. The air issuing from port 93 assists in forming the cushion and also subdivides the cushion to improve the stability of the vehicle. A further port can also be formed in the bottom surface extending parallel to the fore and aft axis of the vehicle to further subdivide the cushion.

Flexible structures 95, 96 and 97 are attached to the bottom surface of the vehicle, the air issuing from the ports 92 and 93 flowing through the structures before finally issuing to form curtains. The structure 95 extending around the front and along the sides of the vehicle is of the form illustrated in FIGURES 4 and 5. The structures 96 across the rear of the vehicle is of the form illustrated in FIGURES 7 and 8, and the structure 97 is of the form illustrated in FIGURE 6. Where additional ports are provided for further subdividing the cushion, for example, a port extending fore and aft as described above, structures according to the invention can also be attached to the bottom of the vehicle below the port. An example of the form of structure which can be provided at this position is as illustrated in FIGURE 6. It will be appreciated that other forms of flexible structures 95, 96 and 97 can be used for the vehicle in FIGURE 9.

I claim:
1. A vehicle for travelling over a surface and which is supported above that surface, at least in part, by a cushion of pressurised gas formed and contained in a space beneath the vehicle, wherein the cushion is contained for at least part of its periphery by a deflectable wall structure, including an upper wall member depending below and flexibly connected to the bottom of the vehicle, and a lower wall member depending below the upper wall member and having its upper end pivotally attached to said upper wall member for movement about a horizontal axis, the upper part of the lower wall member below said axis overlapping the lower part of the upper wall member on that side of the upper wall member nearest to the cushion, whereby the cushion pressure acting on the lower wall member tends to resist deflection of said lower wall member.

2. A vehicle as claimed in claim 1 wherein at least one of the wall members is of inflated construction.

3. A vehicle as claimed in claim 2 wherein the upper wall member is of inflated construction, and including means for supplying a gas to inflate said member.

4. A vehicle as claimed in claim 3 including means for controlling the inflation pressure.

5. A vehicle as claimed in claim 1 wherein the deflectable wall structure extends adjacent to the periphery of the bottom of the vehicle.

6. A vehicle as claimed in claim 5 wherein the deflectable wall structure extends for the entire periphery of the bottom of the vehicle.

7. A vehicle as claimed in claim 5 including at least one further deflectable wall structure extending across the bottom of the vehicle to subdivide side cushion space.

8. A vehicle for travelling over a surface and which is supported above that surface, at least in part, by a cushion of pressurized gas formed and contained in a space beneath the vehicle, wherein the cushion is contained for at least part of its periphery by a deflectable wall structure, including an upper wall member depending below and flexibly connected to the bottom of the vehicle, a lower wall member depending below the upper wall member and having its upper end pivotally attached to said upper wall member for movement about a horizontal axis, the upper part of the lower wall member below said axis overlapping the lower part of the upper wall member on that side of the upper wall member nearest to the cushion, whereby the cushion pressure acting on the lower wall member tends to resist deflection of said lower wall member, means for supplying a fluid to flow down the side of the said wall structure nearest to the cushion, and at least one port in one of said overlapping parts positioned so as to normally be closed by the other overlapping part, whereby on separation of said overlapping parts by deflection of the lower member a flow of fluid is released through said port.

9. A vehicle as claimed in claim 8 wherein said port is formed in the upper part of the lower wall member.

10. A vehicle as claimed in claim 9 including a further flexible wall extending parallel to and spaced a short distance from said wall structure, said fluid flowing between said wall structure and said flexible wall.

11. A vehicle for travelling over a surface and which is supported above that surface, at least in part, by a cushion of pressurised gas formed and contained in a space beneath the vehicle, wherein the cushion is contained for at least part of its periphery by a deflectable wall structure in the form of a nozzle, said wall structure comprising two parallel spaced apart walls, each of said walls including an upper wall member depending below the bottom of the vehicle and a lower wall member depending below the upper wall member and pivotally attached thereto for movement about a horizontal axis, the upper part of each lower wall member overlapping the lower part of the respective upper wall member on that side of the upper wall member facing toward the other parallel wall.

References Cited by the Examiner

UNITED STATES PATENTS

| | | | |
|---|---|---|---|
| 3,191,705 | 6/1965 | Jones et al. | 180—7 |
| 3,204,715 | 9/1965 | Maloof | 180—7 |

BENJAMIN HERSH, *Primary Examiner.*

A. HARRY LEVY, *Examiner.*

M. S. SALES, *Assistant Examiner.*